United States Patent

Paine et al.

[15] 3,648,256

[45] Mar. 7, 1972

[54] COMMUNICATIONS LINK FOR COMPUTERS

[72] Inventors: Thomas O. Paine, Administrator of the National Aeronautics and Space Administration with respect to an invention of; Arthur I. Zygielbaum, Alhambra; James W. Layland, Pasadena; Warren L. Martin, LaCanada, all of Calif.

[22] Filed: Dec. 31, 1969

[21] Appl. No.: 889,374

[52] U.S. Cl. ........................................340/172.5, 340/146.1

[51] Int. Cl. ........................................................G06f 15/16

[58] Field of Search ......................340/172.5, 146.1; 235/157

[56] References Cited

UNITED STATES PATENTS

| | | | |
|---|---|---|---|
| 3,263,219 | 7/1966 | Brun et al. | 340/172.5 |
| 3,287,705 | 11/1966 | Rosenblatt et al. | 340/172.5 |
| 3,307,152 | 2/1967 | Robbins | 340/172.5 |
| 3,400,372 | 9/1968 | Beausoleil et al. | 340/172.5 |
| 3,430,204 | 2/1969 | Milford | 340/172.5 |
| 3,452,330 | 6/1969 | Avery | 340/172.5 |
| 3,480,914 | 11/1969 | Schlaeppi | 340/172.5 |
| 3,482,214 | 12/1969 | Sichel, Jr. et al. | 340/172.5 |
| 3,564,509 | 2/1971 | Perkins et al. | 340/172.5 |

*Primary Examiner*—Paul J. Henon
*Assistant Examiner*—Sydney R. Chirlin
*Attorney*—J. H. Warden, Paul F. McCaul and G. T. McCoy

[57] ABSTRACT

A system is disclosed for a computer to communicate with a selected one of a plurality of other computers through two identical communications links associated with the communicating computers. A single channel connects the two links which operate at a clock rate independent of the computers. Binary digits and clock pulses are combined and converted into a three-level signal for serial transmission over the single channel. Both control messages and data words may be transmitted. Each message and word transmitted is checked for error by the receiving link before it is accepted and the receiving computer is interrupted. If error is found, an error message is automatically transmitted to the originating computer.

17 Claims, 7 Drawing Figures

*INVENTORS*
JAMES W. LAYLAND
ARTHUR I. ZYGIELBAUM
*BY* WARREN L. MARTIN
ATTORNEYS

Patented March 7, 1972 3,648,256

6 Sheets-Sheet 2

*INVENTORS*
JAMES W. LAYLAND
ARTHUR I. ZYGIELBAUM
*BY* WARREN L. MARTIN
ATTORNEYS

*INVENTORS*
JAMES W. LAYLAND
ARTHUR I. ZYGIELBAUM
*BY* WARREN L. MARTIN
ATTORNEYS

*INVENTORS*
JAMES W. LAYLAND
ARTHUR I. ZYGIELBAUM
*BY* WARREN L. MARTIN

ATTORNEYS

Patented March 7, 1972 3,648,256

6 Sheets-Sheet 5

INVENTORS
JAMES W. LAYLAND
ARTHUR I. ZYGIELBAUM
BY WARREN L. MARTIN

ATTORNEYS

*INVENTORS*
JAMES W. LAYLAND
ARTHUR I. ZYGIELBAUM
*BY* WARREN L. MARTIN
ATTORNEYS

COMMUNICATIONS LINK FOR COMPUTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for communication between computers, and more particularly to a communications link connected to a computer in a system of computers for transmitting and receiving control codes and data words.

In order to facilitate load sharing, remote programming, high-speed data interchange between computers, and the use of peripheral equipment associated with one computer by other computers, it is desirable to have a single channel to transmit and receive control codes and data words. For greatest flexibility, such a channel should have a transfer rate independent of computer cycle time, and should be capable of handling full speed input and output operations of the computers.

In the past, transmitter-receiver systems between computers have usually employed separate channels for transmitting synchronizing pulses. While such systems have provided means for linking two digital computers for high speed interchange of data in real-time computer applications, it would be desirable to have a system employing a single channel to link two digital computers for transmission of synchronizing pulses with data.

For even greater flexibility, the communications link associated with a given computer should be capable of transmitting not only data but also control words or codes such that the receiving computer can be prepared to receive data, and the receiving computer can advise through its communications link over the same channel when data has been properly received. If data is not properly received, as determined by a suitable check (such as a parity check) it would be desirable to have the transmitting computer advised without interrupting the receiving computer. The transmitting computer could then make repeated attempts to transmit the same data, until it is received properly by the receiving computer or until a predetermined number of attempts have been made. The number could be determined by a subroutine written into the stored program of the transmitting computer. When that number of attempts have been made, the stored program may branch into a routine devised to take some appropriate action, such as to advise the operator at the transmitting computer of a faulty transmission channel.

Although a communications link between two computers is intended for high speed data interchange such that many tasks and calculations may be performed nearly simultaneously by the computers in communications with each other, it may be desirable to use the communications link to program two or more computers for multiprocessing. Another use for a communications link suitable for transmission of control codes is to allow peripheral devices of one computer to be used by other computers.

SUMMARY OF THE INVENTION

In accordance with the present invention, a separate communications link is associated with each of two computers to provide interfacing functions for transmission of data through a single channel, such as a coaxial cable connecting the two links for bilateral communications, with facilities for transmitting control codes between the computers thus paired, and checking for data errors due to faulty operation of the single channel or the links.

If an error is detected, the communication is rejected and an error code is transmitted to the transmitting computer in response to which the transmitting computer is interrupted to indicate a failure in the attempted communications. If no error is detected, the receiving communications link will interrupt its associated computer which will then execute an operation indicated by the control code received.

A given computer may be provided with a plurality of similar links, each connected to a communications link of another computer through a separate communications channel in order to selectively transmit control codes and data to one of the other computers. That is done by addressing the communications link which is connected between the transmitting computer and the communications link associated with the computer intended to receive the message.

To provide a single channel between pairs of links for serial communications, a self-clocking system is provided which translates the data word or control code being transmitted in serial binary form into a three-level signal. That is accomplished by transmitting a binary 1 as a pulse of a given polarity and a binary 0 as a pulse of opposite polarity. The signal returns to zero volts between pulses under control of a clock generator in the transmitting communications link operation independently of both the transmitting and the receiving computer. The receiving communications link transforms the pulses representing the binary 1's and 0's into a signal of conventional two-level form and a train of synchronized clock pulses, one clock pulse for each pulse of either polarity received through the single channel.

The novel features of the invention are set forth with particularity in the appended claims. The invention will best be understood from the following description when read in conjunction with the accompanying drawings.

DESCRIPTION OF THE PREFERRED EMBODIMENT

Figure 1:
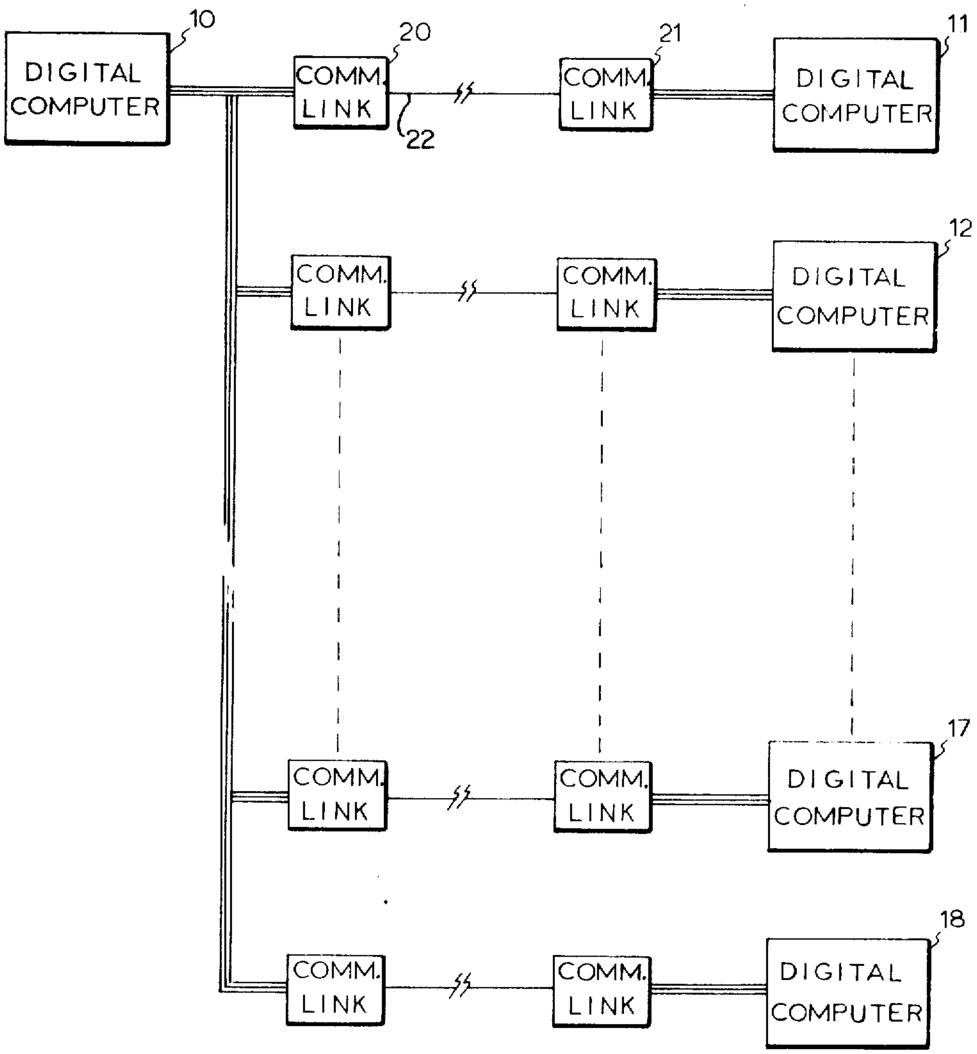
FIG. 1 illustrates in a general block diagram a system enabling one computer to communicate with a selected one of a plurality of computers using a special communications link at each end of a single communications channel connecting the selected computer to the given computer.

Referring to FIG. 1, a plurality of digital computers 10, 11, 12,...17 and 18 are shown interconnected for communications between the computer 10 and different ones of the computers 11 to 18 through communications links, such as link 20 associated with the computer 10 and link 21 associated with the computer 11. It should be noted that only eight computers are shown linked to computer 10 in this preferred embodiment only because a three-bit code is employed in the computer 10 to address a selected one of its communications links for communication with one of the other computers. If more computers are to be addressed by the computer 10, each computer and its associated communications link, such as the communications link 20 associated with the computer 10, need only be modified to provide a larger address code. For example, if the group of computers 11 to 18 are to be expanded into a group of sixteen computers, the address code will need to be expanded from a three-bit code to a four-bit code.

It should also be noted that while each of the computers 11 to 18 is shown connected for communication with only the computer 10 through its associated communications link, such as the computer 11 connected by its communications link 21 to the computer 10 through the communications link 20, each of the computers 11 to 18 may be similarly connected for communication with seven other computers besides the computer 10. The other seven computers may, of course, be selected from the computers connected for communications with the computer 10, or still other computers not shown, thereby providing a complex network for communication between pairs of computers through simple channels. For example, the computers 10 and 11 are paired by the communications links 20 and 21 for bilateral communication through a single channel 22, which may be a coaxial cable between the two links 20 and 21, for transmission of both binary digits and synchronized clock pulses.

To transmit a data word to a selected one of a plurality of computers, the transmitting computer addresses an appropriate one of a plurality of communications links through a conventional output channel with an instruction word having an operation code which will cause the addressed communications link to transmit an operation code to the communications link of a second computer connected to the first communications link by a single channel. That code alerts the second computer that the first intends to communicate with it. The second computer is interrupted when it receives that code, and in response to that interruption will transmit to the first a control code that indicates the second computer is on the line. The first computer responds to that control code transmitted by the second computer by transmitting to the second computer the intended data word, its associated communications link having been conditioned for the transmission of a full data word by a preceding instruction which transmits an alerting code to the second computer. Once the full data word has been received by the communications link associated with the second computer, the second computer is interrupted to cause it to read into its memory the data word through its conventional input channel. Following that, through proper programming, the second computer transmits a control code to the first computer to signal that the data word has been received and accepted in order that the first computer may proceed with further communications, each time using one instruction to set up the links for the transmission followed by an instruction for the actual transmission of the data word. Computers may communicate with each other for purposes other than transferring data by transmitting appropriate control codes, each unique code being decoded by the receiving communications link to energize a unique one of a plurality interrupt signal generators connected to a conventional priority interrupt system of the computer.

While a data word or control code is being transmitted by a given communications link, an internally generated clock pulse is employed for the transmission of binary digits in a three-level form consisting of pulses of a given polarity for binary 1's, pulses of opposite polarity for binary 0's and a zero-volt level between successive pulses of either polarity. The communications link receiving the transmission converts the three-level signal into a conventional two-level signal consisting of pulses of a given polarity for binary 1's, and no pulses or a zero-volt level for binary 0's. The communications link receiving the transmission also generates from the three-level signal a synchronized train of clock pulses, one clock pulse for each of the binary 1's and 0's transmitted. This technique substantially reduces the possibility of error in the transmission channel, and error checking logic in the receiving link guards against any error in the operation of the transmitting link as well as in the transmission channel.

In this preferred embodiment, the computers are equipped with random access core memories, and a priority interrupt system that provides programmed control over input and output operations. It is further assumed that the computers are organized to process data in parallel by bits, and in series by words. Thus, for an input or output operation, a data word is read in or transmitted out in parallel to or from a connector. For example, SDS-900 series computers are equipped with two instructions, Parallel Output (POT) which causes a word in a specified memory location to be presented in parallel at the connector and Parallel Input (PIN) which causes a word present at a connector from an external device to be stored in a specified memory location. The computer's structure requires that the instruction (24-bit word) involving an input or output operation be decoded to determine which of several external devices or subsystems is being addressed.

In the SDS-900 series, an Energize Output M (EOM) instruction must precede the PIN or POT instruction to address the external device. Since the specific embodiment to be described by way of illustration, and not by way of limitation, contemplates an SDS-900 series computer, provision is made for first executing a preliminary EOM instruction to select which of the eight communications links connected in parallel to input and output connectors is to be employed for the input or output operation. Each EOM instruction is followed by a PIN or POT instruction to carry out the required transfer of a 24-bit word from or to a communications link. The PIN instruction transfers the 24-bit word at an input connector in parallel to a computer memory location specified by its address code while a POT instruction causes a word in the computer memory to be presented in parallel at an output connector.

For purposes of describing the present invention, the output connector is assumed to be 24 parallel output lines from the computer identified by the legends $C_0$ to $C_{23}$ while the input connector is assumed to be 24 parallel input lines to the computer identified by the legends $D_0$ to $D_{23}$. The 24 bits of an EOM instruction are held by the computer in an internal register for one computer cycle as will be described with reference to FIG. 2. Bits 3 to 8 are the operation code which form a two-octal-digit operation code that must be 02 for an EOM instruction. Once those bits have been decoded during a computer cycle, an EOM signal is transmitted to all communications links connected to the computer executing the instruction. Bits 9, 10 and 11 determine which of different modes of operation should be followed by the computer one of which is to alert a communications link. That operation is designated by the binary code 011. The binary 1's in bits $C_{10}$ and $C_{11}$ are decoded by the computer to generate a signal SYS that enables the addressed communications link to operate. To complete decoding bit positions 9 to 11, the bit $C_9$ is employed as an additional term for decoding the communications link address in bit positions 21 to 23. Bits $C_0$ and $C_1$ are combined with bits $C_{18}$, $C_{19}$ and $C_{20}$ as a code to designate the class of external device being addressed since other external devices besides communications links may be addressed by an EOM instruction. Accordingly, those bits are included as additional terms in decoding the address of the communications link designated by bit positions 21 to 23. Bits $C_{12}$ to $C_{17}$ to the EOM instruction comprise two octal digits which specify the function that the addressed communications link is to perform.

EOM instructions are used in the present invention for two distinct purposes: before an input (PIN) or output (POT) instruction to alert a communications link for a word transfer to or from the computer, and by itself to transfer control codes from the addressed communications link to another communications link to cause a computer connected to the other communications link to take designated action through its priority interrupt system. Accordingly, all of the bits of an EOM instruction except bits $C_2$ through $C_8$, $C_{10}$ and $C_{11}$, are available to all communications links while an EOM signal is present in response to the computer decoding bits $C_2$ through $C_8$.

Figure 2:
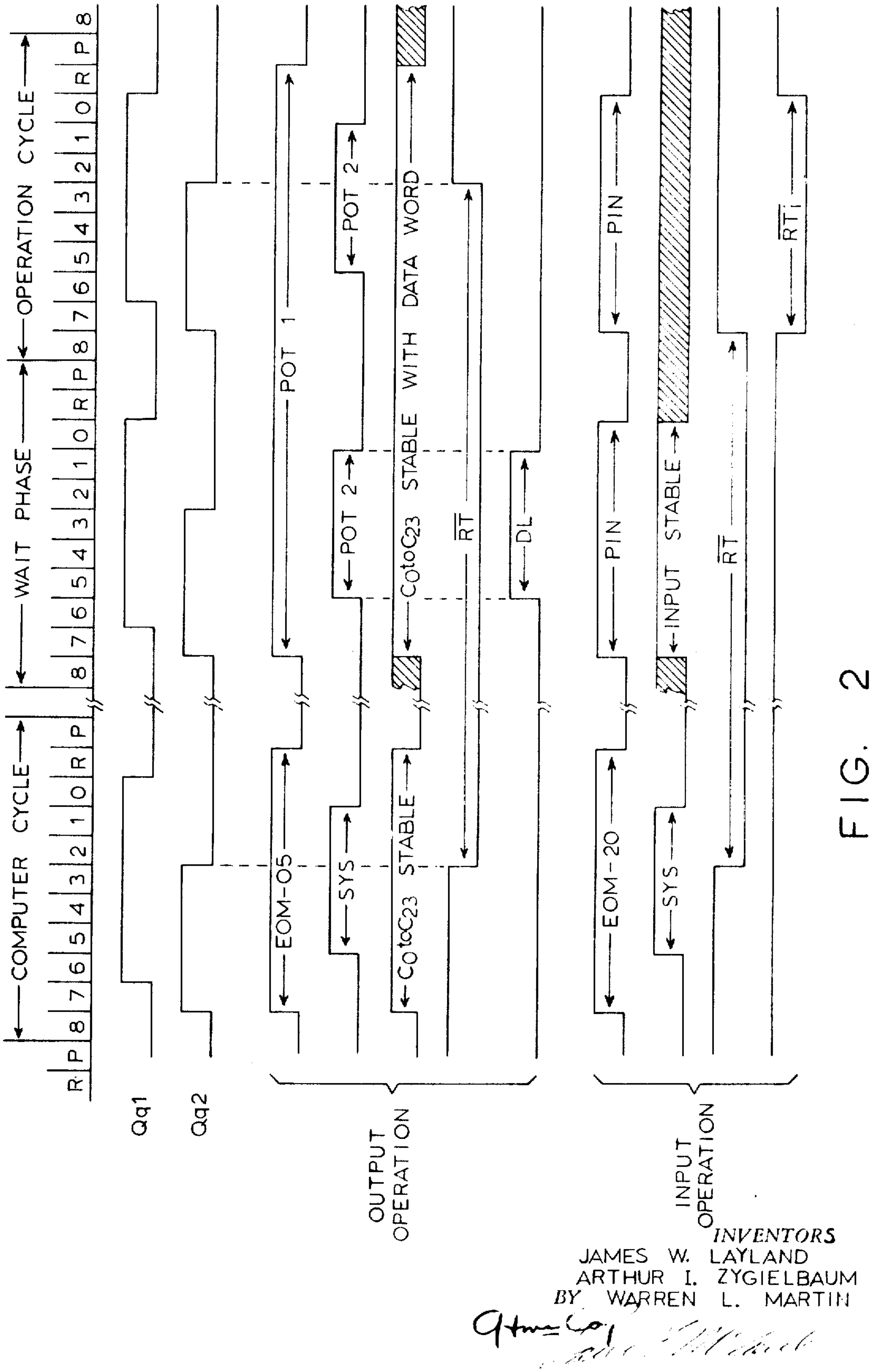
FIG. 2 is a general timing diagram for the operation of a computer connected to a communications link for transmission of a data word or control code.

The signal SYS generated during the EOM period shown in FIG. 2, is in response to binary 1's in bits $C_{10}$ and $C_{11}$ of an EOM instruction. Besides the SYS signal, a two phase clock Qq1 and Qq2 shown in FIG. 2 is continually transmitted by a computer executing an EOM instruction to all communications links connected directly to it. That two phase clock is employed only to synchronize the operation of a communications link with the computer to which it is directly connected, and is not to be confused with a clock system employed to synchronize operation of a communications link in transmitting and receiving a data word or control message. The communications link is synchronized by an internally generated clock while transmitting and by an input clock received with a data word or control message. The input clock is carried by the transmission signal which consists of pulses of a given polarity for binary 1's, pulses of opposite polarity for binary 0's and zero volt level between successive binary digit pulses.

The transmission of control code messages in response to EOM instructions is provided to facilitate programming the data transfer between computers. For instance, immediately upon seeing a need to communicate, one computer should be able to send out a "ring-up" message to the other computer. That is done with an EOM instruction having an octal operation code 03. The EOM-03 control code message received by the communications link associated with the other computer decodes the message and generates an appropriate interrupt signal to cause the other computer to respond with an EOM instruction having an octal operation code 04. The EOM-04 instruction causes a control code message to be transmitted to the communications link associated with the first computer to indicate that the second computer is on the line. The first computer may then commence transfer of data using an EOM-05 instruction to alert by specific address the communications link through which transmission is to be made followed by a POT instruction to transfer a 24-bit word from the computer memory to the transmitting communications link. Serial transmission then follows automatically.

Once the data word has been received by the communications link associated with the second computer, an interrupt signal is transmitted to the second computer by the receiving communications link indicating that data has been received. The stored program of the second computer recognizes that interrupt signal and causes an EOM-20 instruction to be executed followed by a PIN instruction. The EOM-20 instruction does not transmit a control code message to the first computer; it merely enables transfer off a word into the computer from its input connector. Thus, once the operation code of the PIN instruction has been decoded, a PIN signal is transmitted to the communications link associated with the second computer to enable the 24-bit word received and stored in a register to be available at the PIN connector terminals $D_0$ through $D_{23}$ in order that the second computer may enter the data word received in its memory.

Successive pairs of EOM and POT instructions are executed by the first computer to transfer additional words of data until all of the data has been transferred, at which time the first computer may execute an EOM instruction having an octal operation code 06 which transmits a control code message to the communications link associated with the second computer indicating that the first computer has completed transfer of data. However, the first computer may be programmed so as not to transmit another word of data until it has received a control code message from the second computer indicating that the last word transmitted has been properly received. To accomplish that, the second computer is programmed to execute an EOM-07 instruction having an octal operation code 07 after it executes a PIN instruction to enter the last word received into the computer memory. That EOM-07 instruction transmits a control code message to the communications link associated with the first computer to cause an interrupt signal to be generated that indicates the data has been received by the second computer.

If a control message or data word transmitted by one communications link to the other is not completely received, or is received with a parity error, the receiving communications link will not proceed to generate an appropriate interrupt signal; instead it will generate and transmit an error message to the transmitting communications link. When the transmitting communications link receives the error message an appropriate interrupt signal is generated to cause the computer associated therewith to retransmit the data word or control message. The transmitting computer may be programmed to keep track of the number of times the transmission has failed and to take some other action after a predetermined number of attempts have been made, such as to cease trying to transmit and to output a message through a control console indicating the failure, such as by typing out a message through a computer controlled typewriter.

In the event of an error in the transmission, the receiving computer will never see the transmitted control code message or data word; instead its associated communications link will advise the transmitting computer of the error so that, under normal operations, the transmitting computer will receive a reply even if it is only an error message. But in the event of a total failure in the system, even an error message may not be communicated. For example, it could conceivably happen that the first computer fails to receive a reply to a transmitted control message such as the "ring-up" message, as when the single channel to the receiving communications link is short circuited so that even an error message is not received by the first computer. To allow for versatility in the system, a programmed countdown may be employed to start an appropriate operation to recover from the situation. Thus, computers in the system may be programmed to provide a reply to each EOM instruction or data word transfer except an EOM-06 instruction indicating the transmitting computer has completed transfer of data.

The ability to transmit control message codes in response to EOM instructions will significantly increase the flexibility of a multiple computer system. Using only two octal digits for the operation code of an EOM instruction provides 64 possible operations; only five such codes have been assigned. The others can be used for a variety of operation. For example, if a given computer is assigned certain real time functions and for some reason it can no longer carry on, that computer may be programmed to transmit a specified control message code to another computer in response to an EOM instruction to cause the other computer to take over the real-time functions of the failing computer.

Before describing an exemplary implementation of a given communications link, input and output operations of a computer of the SDS-900 series will be explained further with reference to FIG. 2. For an output operation, including those EOM instructions which do not precede an input or output instruction, the EOM instruction is decoded during the presence of the SYS signal. The instruction is stable in a C-register during that period and the necessary outputs from that register are connected to all communications links directly associated with the particular computer by a connector having pins which may be identified by the legends $C_0$ to $C_{23}$ corresponding to bits in that register.

If the instruction is an EOM instruction for which a control code message is to be transmitted, the transmission commences as soon as decoding is complete, which is when signal SYS and clock Qq2 are both true. For an output operation, a POT instruction follows an EOM-05 instruction, but not until the receiving computer has executed an EOM-04 instruction. When the transmitting computer does execute a POT instruction, it generates POT1 and POT2 signals as shown in FIG. 2. The computer then proceeds to wait for an integral number of computer cycles while the associated communications link is prepared to receive the data word through the output connector (terminals $C_0$ to $C_{23}$). When prepared, it generates a ready signal ($\overline{RT}$) which is normally true and is made false for one computer cycle. The signal $\overline{RT}$ is sampled during each computer cycle of the wait phase. Once that signal is false, the data word is transferred from the C-register in the computer to the communications link. The first cycle of the POT instruction loads the C-register from a memory location. That requires two cycles before the computer can enter the wait phase.

The PIN instruction provides for direct parallel transfer of 24 bits from the communications link to the C-register in the computer. Like the POT instruction, a PIN instruction is preceded by an EOM instruction to prepare the receiving communications link for a parallel transfer operation. Then the PIN instruction is decoded and the computer enters a wait phase as for the POT instruction. Data transfer is accomplished in the computer by first resetting the C-register and then entering information on the input connector terminals $D_0$ to $D_{23}$. This occurs every cycle until the computer receives a ready signal ($\overline{RT}$). It then terminates the input operation.

Implementation of a given communications link, such as the communications link 20, will now be described with reference first to a functional block diagram illustrated in FIG. 3. Since all of the communications links are identical in construction and operation, the description of the communications link 20 will suffice for all. The only difference in the construction of the various communications links is in their EOM decode section 30 connected to output connector terminals of the computer 10 to decode bits $^{C}21$ to $^{C}23$ of an EOM instruction that specify which of seven communications links connected to the computer 10 is to transmit. If the transmission is of a control message code, the instruction is effectively executed during the same computer cycle by the communications link 20, but if a data word is to be transmitted, a flip-flop $FF_1$ (FIG. 6) is set by the EOM decode section 30 to enable only the addressed communications link to respond to a subsequent POT instruction that sets a flip-flop $FF_2$ (FIG. 6) and causes a 24-bit word to be transmitted from the computer 10 to a communications link connected to the single channel 22.

When a POT instruction is executed, a data load flip-flop $FF_5$ (FIG. 6) is set to enable a parallel-to-serial data converter 31 to receive in parallel the word to be transmitted directly from the output connector of the computer 10. Once the word to be transferred has been entered into the converter 31, the data load flip-flop in the EOM decode section 30 is reset and the word is transmitted serially through an output driver 32 in response to clock pulses from a clock generator 33. The clock generator operates at a frequency of 4 MHz. independently of all other clock generators in computers and communications links in the system.

A counter 34 connected to the clock generator 33 is controlled by the EOM decode section 30 to count 24 clock pulses to be applied to the converter 31 for transmission of 24 bits of the data word, and a 25th clock pulse which is applied to a parity generator 35 that transmits to the output driver 32 a 25th pulse for a check on the data transmitted by the receiving communications link. The logic for the parity generator 35 may be for either an odd or an even parity check using conventional techniques. An OR-gate 36 combines the parity bit with the data bits transmitted serially to the output driver 32. An additional (26th) pulse is generated to reset all functions in the communications link.

As noted hereinbefore, an EOM instruction precedes a POT instruction for transfer of a data word. Accordingly, the EOM decode section 30 responds to the octal code 0 in bit positions 12 to 14 of the EOM instruction to enable a control message generator 37 to transmit a four-bit code through the OR-gate 36 to the output driver 32 to alert the receiving communications link that a data word follows. That four-bit code is comprised of simply bits 15 to 17 of the EOM instruction and a parity bit. The four-bit control code message generated is stored in parallel until the counter 34 is enabled to count four clock pulses from the generator 33 in response to a control signal from the EOM decode section 30. The counter 34 then enables the control message code to be transmitted serially from the generator 37 to the output driver 32. Once four clock pulses have been counted, clock pulses are removed from the control message generator 37 but the count of four is retained in the counter 34 until the following POT instruction is executed at which time 25 clock pulses are counted as noted hereinbefore to increase the count from four to 29. Once the count of 29 is reached, the counter 34 is reset to terminate a word transfer operation in response to the additional clock pulse generated.

If an EOM instruction is not one having an operation code 05 indicating that data follows, the instruction will cause a four-bit control code message to be transmitted, just as the four-bit code message indicating that data follows is transmitted. The only difference is that the EOM decode section 30 will operate to cause the counter 34 to not only terminate clock pulses being applied to the control message generator 37 at the count of four but also to cause the counter 34 to be reset in response to one additional (fifth) clock pulse generated.

The output driver 32 responds to binary digit signals from the OR-gate 36 to produce on the output channel 22 pulses of positive polarity for binary 1's, and pulses of a negative polarity for binary 0's with a return to a zero-volt level between pulses as shown for a transmitted four-bit binary code 1001. That is accomplished by the circuit shown in FIG. 4 which comprises a pair of clock inverting amplifiers 40 and 41 connected to the OR-gate 36, directly in the case of the inverting amplifier 40 and through an inverter 42 in the case of the inverting amplifier 41.

The clock pulses applied to the inverting amplifiers 40 and 41 are synchronous with the clock pulses metered to the control message generator 37 and the parallel-to-serial converter 31. Consequently, for each bit 0 or 1 of a four-bit message code or a 25-bit data word transmitted, one of the inverting amplifiers 40 and 41 will transmit a positive pulse in coincidence with the applied clock pulse. If a bit to be transmitted is a binary 1, only the inverting amplifier 41 will transmit a positive pulse. A transistor $Q_1$ inverts the positive pulse and a transistor $Q_2$ in the output driver stage inverts the pulse again to drive a positive pulse through the 50-ohm load of a coaxial cable for the single channel 22 of FIG. 2 represented in FIG. 1 by a resistor 43. A binary 0 digit to be transmitted enables only the inverting amplifier 40 to transmit a positive pulse which is inverted by a transistor $Q_3$ in the output drivers stage. The result is a three-level signal which carries clock timing information in the form of the leading edge of each positive and negative pulse and binary information represented by the polarity of the pulses being transmitted.

Figure 5:
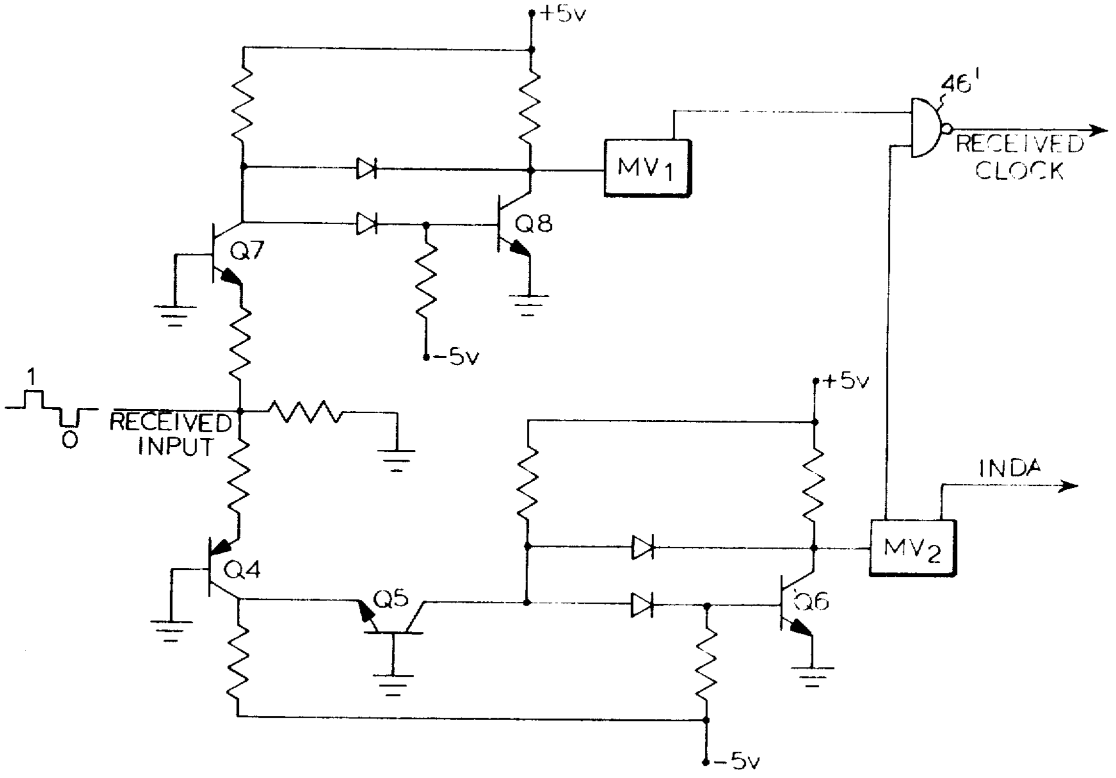
FIG. 5 is a schematic diagram of a line receiver for use in the communications link shown in FIG. 3.

When a three-level signal is received by the communications link over the channel 22, a signal conditioner 45 inverts negative pulses received to provide binary 1 pulses on one output line and binary 0 pulses on a second output line as shown in FIG. 5. The binary 1's are processed by transistors $Q_4$, $Q_5$ and $Q_6$ while binary 0's are processed by transistors $Q_7$ and $Q_8$. Both output lines are connected to an input clock generator 46 (FIG. 3) which effectively ORs them to provide an input clock (ICLK) that is applied to an error check section 47, a control message decode section 48 and the counter 34. Accordingly, that input clock generator is shown in FIG. 5 as comprising monostable multivibrators $MV_1$ and $MV_2$ for data pulse shaping and inverting, and a NAND-gate 46 performing an OR function. A complementary output is derived from the pulse shaper $MV_2$ for the train of data pulses.

The section 47 checks for parity errors and the receipt of the proper number of binary digits while the control message decode section receives a three-bit control code. After four internal clock pulses have been counted by the counter 34, the parity check is made with the fourth bit and if equal the control message decoder is enabled to generate a computer interrupt signal over an appropriate one of several lines, only one of which is shown in FIG. 2, to cause the computer 10 to be interrupted and take some action appropriate for the interrupt signal generated. For example, if the communications link 20 receives a message code (from bit positions 15 to 17 of an EOM instruction having an octal operation code 03 from the transmitting computer) to indicate that the transmitting computer is "ringing-up" the computer 10, when the counter 34 reaches the count of four, an appropriate flip-flop is set to transmit an interrupt signal to the computer 10.

If the last EOM instruction executed by the transmitting computer was a "load data" instruction which precedes a POT instruction and enables the transmitting data link to accept data, the control code of that EOM instruction is received through the signal conditioner 45 of the communications link connected to the other end of the single channel 22. There the control code message is decoded to enable a serial-to-parallel converter 49 to receive a 24-bit data word. The "load data" signal generated by the control message decode section 48 to control the serial-to-parallel converter 49 is also employed to control the counter 34 so that it is not reset after the four-bit message code has been received, but will reset after another 25 input clock pulses from the circuit 46 have been counted. The data load control signal from the control message code section 48 is then removed and an appropriate interrupt signal is transmitted to the computer 10 indicating that a data word has been received so that the computer 10 will execute an EOM-20 instruction and a PIN instruction to read the data word in parallel from the serial-to-parallel converter 49. However, it should be understood that any computer may be employed which will respond to an interrupt signal to cause the computer 10 to transfer in parallel an incoming word from the serial-to-parallel converter 49. There is nothing inherent in the communications link 20 which requires a preliminary EOM instruction to be executed before a PIN instruction is executed; the limitation is only in the computer. Other computers which may be used may not be so limited, in which case an instruction can be executed to read in the data word as soon as the computer can be interrupted. Only minor and obvious modifications need be made to accommodate computers of other types.

An error message generator 50 responds to the error checking section 47 to transmit a four-bit error code. That is accomplished by enabling the clock generator 33 to transmit four clock pulses to the counter 34 after it has been normally reset for transmission of the message from the error message generator 50 in the same manner as a control message is transmitted from the generator 37, after three transmit periods (20 $\mu$sec.) have elapsed to make sure that the transmitting link has gone back to idle. At the same time, the error check section 47 halts all further operations that would otherwise be indicated by inhibiting the control message decoder from generating any interrupt signal including an interrupt signal which would call for the computer 10 to execute a PIN instruction in response to a data word received.

A preferred embodiment of a communication link will now be described with reference to the logic diagrams of FIGS. 6 and 7. All gates in the diagrams are NAND logic gates which transmit a false (0 volt) output signal when all of its input signals are true (+5 volts), and a true output signal when any one of its input signals is false. Accordingly, to perform AND functions of certain signals, the signals are simply applied to NAND gates, but the output signals thus derived must be inverted to obtain the true AND functions. To perform an OR function, it is necessary to apply the complements of signals. Accordingly, NAND gates are frequently used with a single input simply to obtain the complement of the input signal. Where NAND gates are used simply as inverters, no specific reference will be made to them in the description.

To facilitate understanding the logic diagrams, some further general observations may be made. First, all flip-flops are of the J-K type which respond to the fall (+5-volt to 0-volt transition) of a clock pulse as follows: change state when both input terminals J and K are true; remain in present state when both input terminals are false; be set in the "1" state with an output Q true when the input terminal J is true and the input terminal K is false; and be set in the "0" state with a complementary output $\overline{Q}$ true when the input terminal J is false and the input terminal K is true. In addition to this J-K control of the state of the flip-flops, there is a direct reset (0 volt) input used to set the state of a flip-flop with the complementary output $\overline{Q}$ true where necessary. Second, all shift registers are of a type adapted to (1) receive data in parallel when a data enable (DE) terminal is true, and (2) to shift the data thus entered out, or to serially shift new data in, when a shift enable (SE) terminal is true and clock pulses are applied at another terminal.

During a transmit mode, flip-flop $FF_3$ (FIG. 7) and flip-flop $FF_4$ (FIG. 6) are both in the reset or "0" state ($\overline{Q}$=1) to enable the EOM decoder 30 (FIG. 6) to decode bits $C_0$, $C_1$, $C_9$ and $C_{18}$ to $C_{20}$ of an EOM instruction and generate a signal EOK, according to the Boolean logic expression:

$$EOK=\overline{C}_0\cdot\overline{C}_1\cdot\overline{C}_9\cdot C_{18}\cdot\overline{C}_{19}\cdot C_{20}\cdot UNIT\cdot SYS\cdot\overline{FF}_3\cdot\overline{FF}_4\cdot\overline{HOP}$$

The term UNIT consists of bits $C_{21}$ to $C_{23}$ which address one of seven communications links connected to the output connector terminals $C_0$ to $C_{23}$ of the computer. The signal SYS is generated by the computer in response to the logic expression:

$$SYS=C_{10}\cdot C_{11}$$

Since an EOM instruction is uniquely identified as such only when the instruction-type code in bit position 9 to 11 is an octal 3, bit $C_9$ must be zero for the EOM decoder 30 to initiate an EOK signal. Bit positions 1, 2, 18, 19 and 20 are used to specify an operation by a communications link, since other types of peripheral devices may be connected to the output connector of the computer. Thus, each link connected to the output connector of the computer must decode the EOM instruction, but only one will initiate an EOK signal, and then only if it is not receiving a data word or a message code, as indicated by a signal $\overline{FF}_3$ from the flip-flop in FIG. 7 and a signal $\overline{FF}_4$ from the flip-flop in FIG. 6. The roles of those flip-flops during a receiving mode of operation will be described later with more specific reference to FIG. 7.

The last term $\overline{HOP}$ for the logic expression of EOK is a 0-volt signal generated to halt operation when an error occurs during a receiving mode; it is otherwise positive to enable the EOM decoding function. Accordingly, for the signal EOK to be initiated, it is necessary that the communications link being addressed be not receiving a message and also not have been halted while operating in the receiving mode by the error-checking section 47 (FIG. 3) as will be described with reference to FIG. 7. This is necessary because if an error is detected in a data word or message code received, the receiving link must not carry through the normal operation of accepting and acting on the word or code received; instead it must transmit to the originating computer an error message after which the signal $\overline{HOP}$ is again set true (positive).

An EOK signal will set a flip-flop $FF_1$ upon the fall of the next clock phase Qq2 during the EOM and SYS signals shown in FIG. 2. The EOM signal is a cycle timing signal of the computer, and generated in the computer by decoding bit positions 2 through 8 of an EOM instruction. The flip-flop $FF_1$ remains set until the proper number of bits have been transmitted, as indicated by a signal $\overline{CT}$. The proper number is four when only a message code is to be transmitted from a shift register 62, which is whenever the first octal digit of the function code (bits $C_{12}$ to $C_{14}$) is zero.

For an EOM-05 instruction, the number of bits to be transmitted is 29, first four bits for the message code that "data follows" in response to the EOM-05 instruction, and then 25 bits of data in response to a POT instruction. That is accomplished by a term $\overline{FF}_5$ to a gate 63 which inhibits a flip-flop $FF_7$ from initiating a count signal (CT) when a gate 64 detects a count of three to generate a signal $\overline{CT3}$ and set the flip-flop $FF_7$ at the count of four in the counter 34. The counter 34 is reset by the next clock pulse CLKR after the signal CT is initiated. Therefore, when the term $\overline{FF}_5$ at gate 63 forces the signal CT to be generated by a flip-flop $FF_8$ (via a gate 65 which functions as an OR gate) according to the following Boolean logic expression:

$$CT=(FF_7\cdot\overline{FF}_4\cdot\overline{FF}_5)+FF_8+(FF_3\cdot HOP)$$

The third term $FF_3\cdot HOP$ initiates the signal CT through a gate 66 to reset the counter 34 when, during a receiving operation (indicated by $FF_3$) an error has been detected (indicated by HOP). This is necessary because the counter 34 is also used in the receiving mode, as will be described more fully, and it is necessary to clear the counter immediately to transmit a four-bit error code message.

It should be noted that the timing signal for loading a four-bit code into the register 62 is when the flip-flop $FF_1$ is set, which is at the fall of the computer clock Qq2. That is controlled by a gate 67.

After the flip-flop $FF_1$ has been set, a gate 70 initiates a transmit code (TC) signal at the end of the current clock phase Qq2, which is when EOK is no longer true. This enables the register 62 to be shifted according to the following Boolean logic expression:

$$SE(\overline{EOK}\cdot FF_1\cdot \overline{FF_7})+(\overline{HOP}\cdot FF_3\cdot \overline{FF_7})$$

The second term $\overline{HOP}\cdot FF_3\cdot \overline{FF_7}$ generated by a gate 71 is ORed by a gate 72 to enable shifting of the register 62 when a transmission is being received as indicated by the signal $FF_3$ until a count of 4 is reached, as indicated by the signal $\overline{FF_7}$ no longer being true, or until an error in transmission is detected, as indicated by the signal $\overline{HOP}$ no longer being true. This alternative control of the shift register 62 is for entering the four-bit message code being transmitted by another computer through the communications link to which it is connected, such as the four-bit code transmitted in response to an EOM-05 instruction indicating that data follows. The four-bit code is received serially by the register 62 as input data (INDA) from the signal conditioner 45 shown in FIGS. 3 and 7, and described more fully with reference to FIG. 5.

Since all of the operation codes for an EOM instruction having a zero in but positions 12, 13 and 14 are used for transmitting a function code, such as the instruction EOM-05 indicating that a data word will follow (in response to a POT instruction), only the instruction EOM-05 will be described. The transmission of the function code for other EOM instructions are the same insofar as the shift register 62 is concerned. Accordingly, the function decoder first detects a zero in bit positions 12, 13 and 14 in one gate and employs the output of that one gate to enable a decoder for bits $C_{15}$, $C_{16}$ and $C_{17}$. If those bits are binary 101 for an octal 5, a flip-flop $FF_5$ is set on the fall of the next computer clock Qq2 and the data enable (DE) terminal of the shift register 62 receives a true signal to enter those bits and a parity bit for transmission. If those bits are decoded as any other octal code assigned for a particular function, the result is the same, but the flip-flop $FF_5$ is not set. Accordingly, the decoder is implemented to separately decode the assigned octal codes 00 and 03 to 07 and the results are ORed so that regardless of which octal code is present, the shift register is loaded with the bits of the second octal digit and one parity bit generated in the same manner as for the octal code 05. The ORed output is shown in FIG. 6 as EOM-OX. Since all of the octal codes 00 and 03 to 07 are assigned a function that requires transmitting a message code, it would be possible to simplify the decoder 61 to generate the signal EOM-OX according to the following Boolean expression:

$$EOM\text{-}OX=\overline{C}_{12}\cdot\overline{C}_{13}\cdot\overline{C}_{14}$$

The EOM-05 signal could then be decoded according to the expression:

$$EOM\text{-}05=EOM\text{-}OX\cdot C_{15}\cdot\overline{C}_{16}\cdot C_{17}$$

The assigned codes are as follows:

- EOM-00—"help" transmitted for some emergency action programmed in the receiving computer
- EOM-03—"ring up" transmitted to receiving computer
- EOM-04—"ring OK" replied by the receiving computer
- EOM-05—"data follows" transmitted to receiving computer
- EOM-06—"disconnect" transmitted to receiving computer to indicate communication is terminated
- EOM-07—"data received OK" replied by receiving computer.

The octal codes 01 and 02 are reserved for error messages to be described later. The function decoder 61 would, in either case, have the added tasks of generating a proper parity bit for the code to be transmitted and decoding the function code 20 for use with a PIN instruction to accept into the computer an incoming data word.

The parity bit may be provided for either an odd or an even parity check, as desired. For example, assuming an even parity check is selected, the parity generator in the section 61 may be implemented with a conventional full-adder circuit for the addition of two binary digits and a carry, using the output sum as the parity bit to be entered into the shift register 62 to make the number of binary 1's transmitted always equal to an even number.

Figure 3:
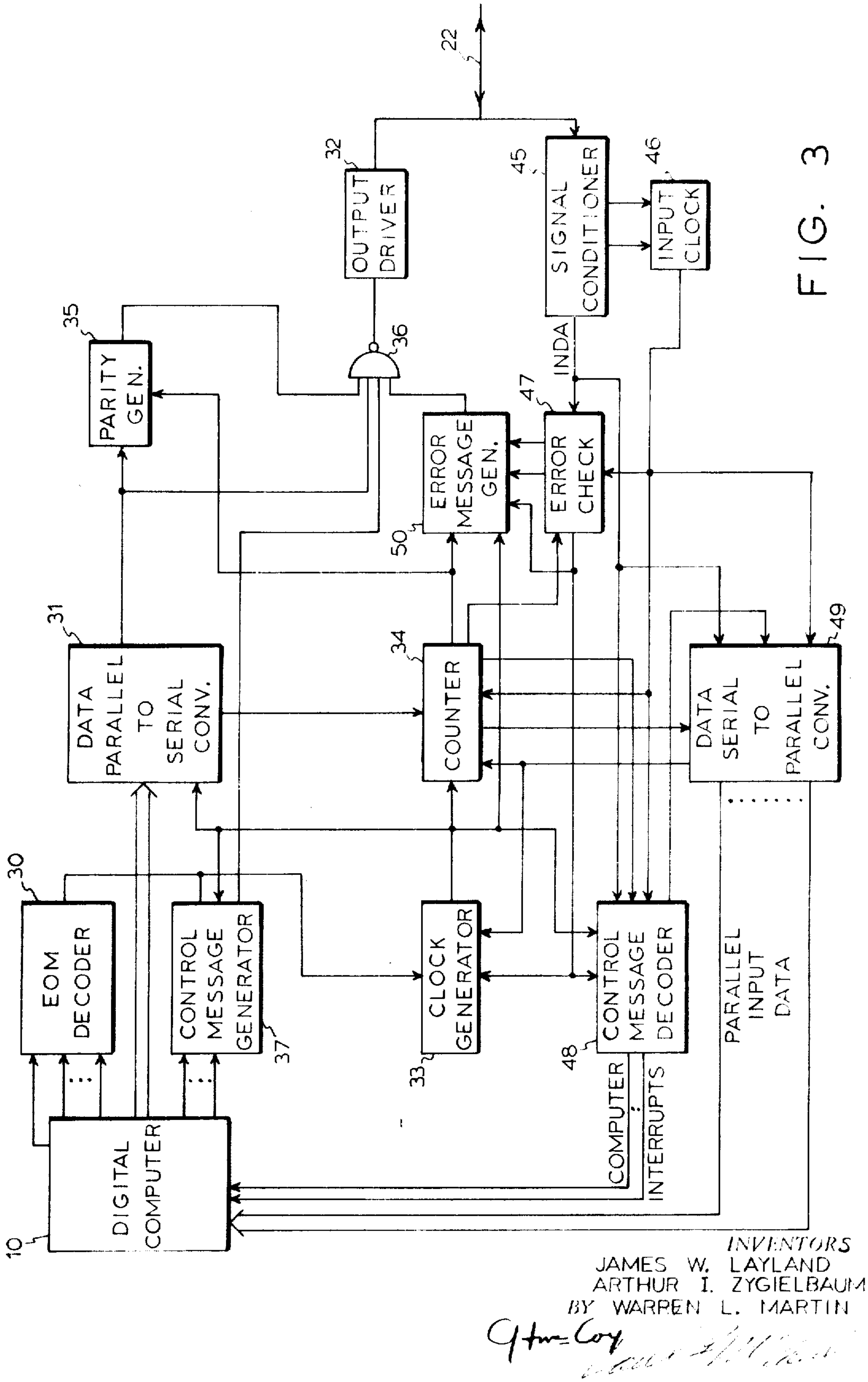
FIG. 3 is a functional block diagram of a communications link in the system of FIG. 1.
Figure 4:
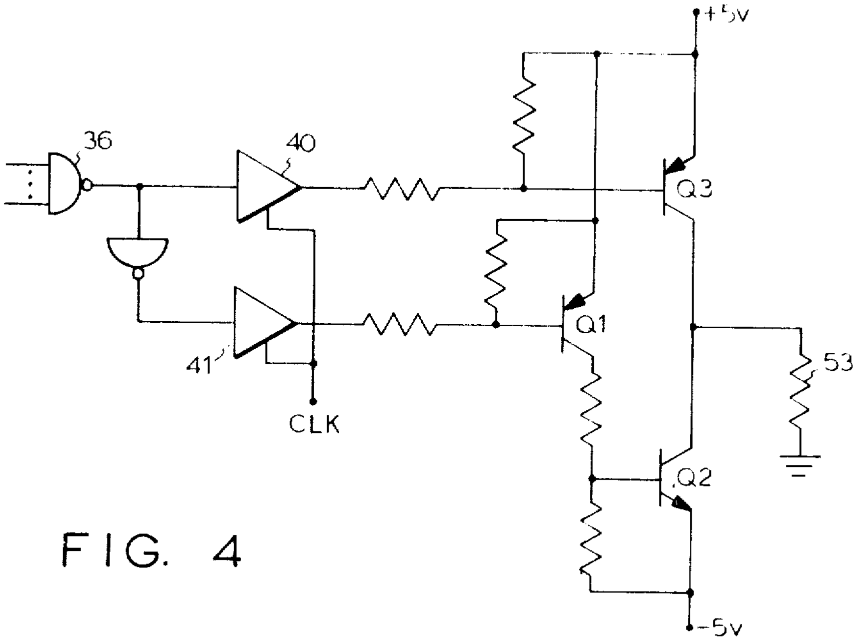
FIG. 4 is a circuit diagram of an output driver for use in the communications link shown in FIG. 3.
Figure 7:
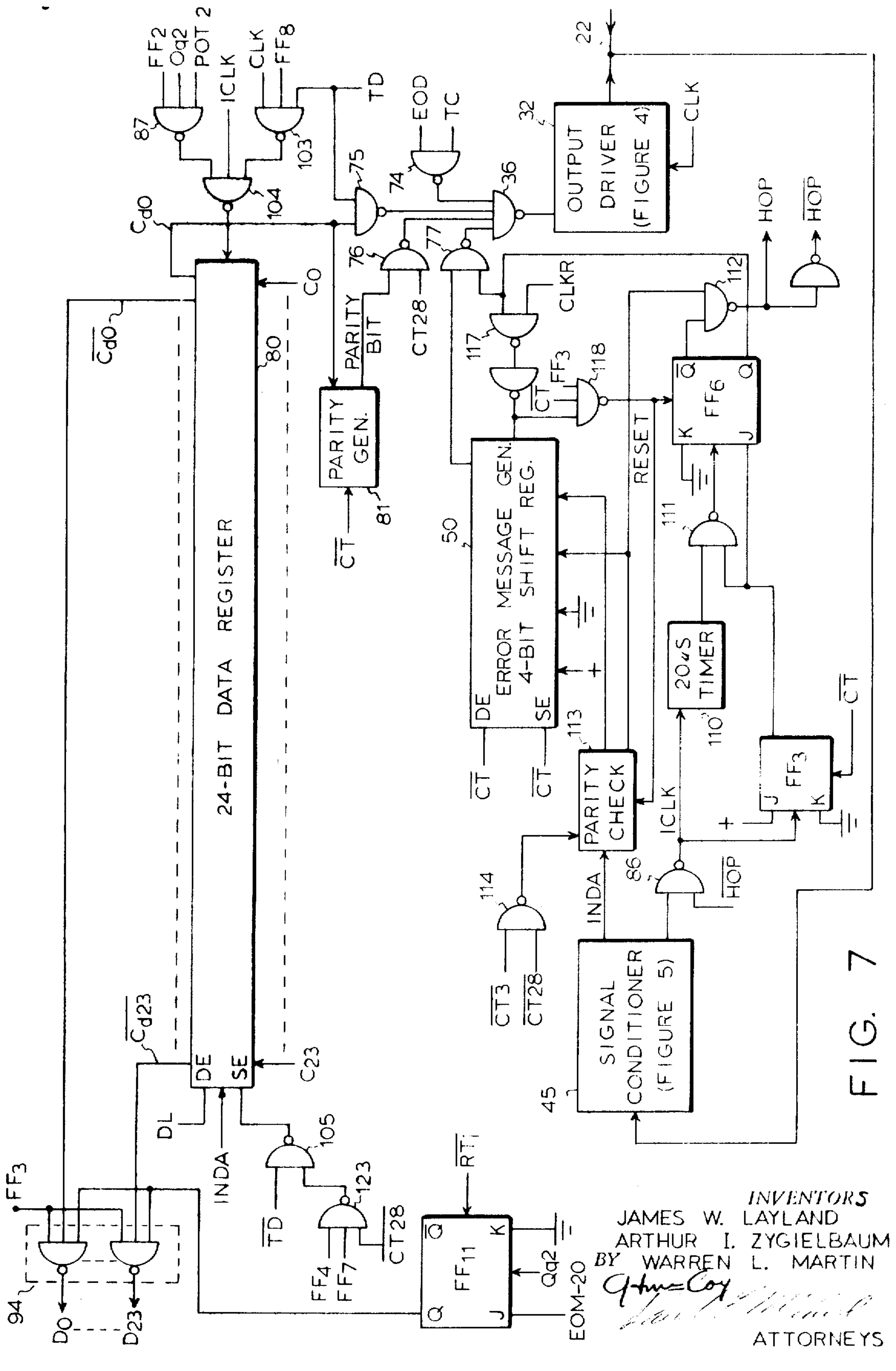
FIG. 7 is a logic diagram of sections which, together with the logic diagram of FIG. 6, completes the communications link of FIG. 3, and includes a section for parallel to serial and serial to parallel conversion of data being transmitted and received.

Returning to a description of a transmitting operation for an EOM-05 instruction, the four-bit code entered in parallel into the register 62 under the control of the function decoder 61 is serially transmitted as output data (EOD) from the register 62 to the output driver 32 shown in FIGS. 3 and 7, and described more fully with reference to FIG. 4 via a gate 74, and the gate 36 which functions as an OR gate. The full Boolean logic for the output driver is given by the following expression:

$$OUTPUT=(TC\cdot EOD)+(TD\cdot C_{do})+(CT_{28}\cdot PARITY\ BIT)+(HOP\cdot RROR\ CODE)$$

Gate 74 responds to a "transfer code" signal TC and the serial output EOD of the shift register 62. For a data word, a gate 75 responds to a "transfer data" signal TD and the serial output $C_{do}$ of a 24-bit data register 80 (FIG. 7) which receives a data word to be transmitted in parallel through terminals $C_0$ to $C_{23}$ of the same connector used in decoding an EOM instruction but in response to a POT instruction, as will be more fully described.

The parity bit for a data word transmitted is generated by a parity generator 81 which receives the data bits serially as they are being transmitted to determine whether the parity bit, transmitted as the 25th bit, should be a 1 or 0. For an even parity bit, the generator 81 may consist of simply a flip-flop which is alternately set and reset by binary 1's. When the 24th bit has been transmitted as the 28th bit of a complete data transfer operation (four bits for the message code transmitted by an EOM-05 instruction plus 24 bits of the data word), the state of the flip-flop is sampled by gate 76. If the flip-flop is set, the parity bit transmitted is a binary 1; otherwise it is a binary 0. The generator 81 is then reset when the 30th bit has been transmitted by the signal $\overline{CT}$ initiated by the flip-flop $FF_8$ (FIG. 6) which is set by the 30th clock pulse CLKR received by it. The signal $\overline{CT}$ at a gate 82 enables the clock generator to transmit the extra clock pulse CLKR needed to reset the flip-flops $FF_7$ and $FF_8$.

Figure 6:
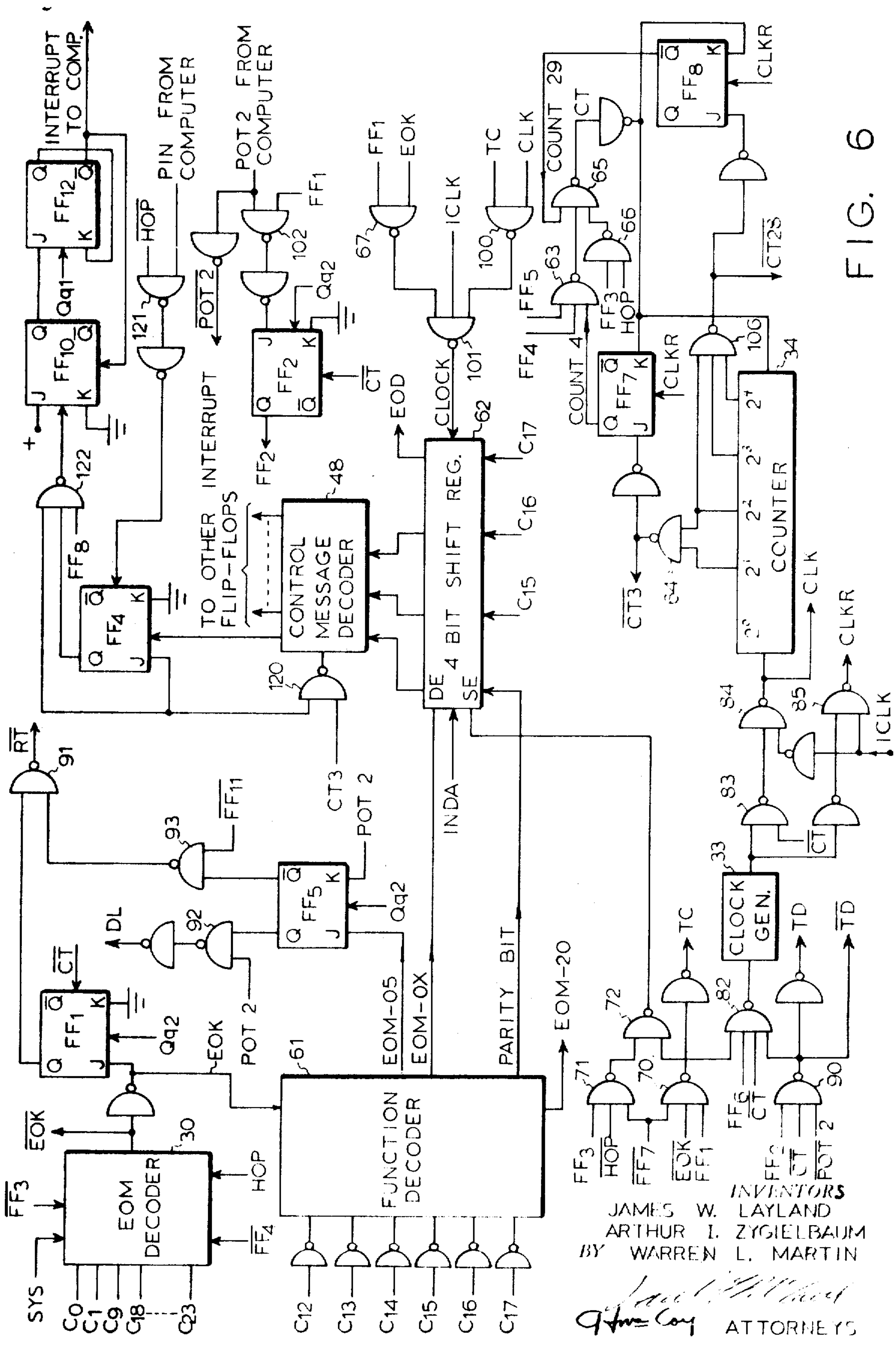
FIG. 6 is a logic diagram of a decoding section and of a transmitting and receiving control section of the communications link illustrated in FIG. 3.

The clock generator 33 shown in FIGS. 3 and 6 transmits clock pulses at a frequence (e.g., 2 mHz.) independent of the computer transmitting a message code or data word when enabled by a positive signal from the gate 82 which provides an OR function. Thus, when all input signals to the gate 70 are true, the output of the gate 82 is true (positive) and clock pulses are generated to transmit a four-bit code message, at which time the flip-flop $FF_7$ is set and the complementary output signal $\overline{FF_7}$ is no longer true, to stop the generator after 3 clock pulses have been counted by the counter 34, a fourth clock pulse is generated to transmit the fourth bit of the message code, and an extra pulse is transmitted to reset the flip-flop $FF_7$.

A gate 83 is enabled to transmit the generated clock pulses to the counter 34 (via a gate 84 which provides an OR function). The flip-flops $FF_7$ and $FF_8$ receive clock pulses through a gate 85 which also provides an OR function. The second source of clock pulses to the gates 84 and 85 is an input clock (ICLK) derived from a message code or data word received by the signal conditioner 45 shown in FIGS. 3 and 7, and transmitted through a gate 86 unless an error has been detected by a flip-flop $FF_6$ being set in a manner to be explained in connection with a description of the receiving mode of operation. Thus, while gate 84 transmits 4 or 29 clock pulses CLK to initiate the signal $\overline{CT}$, the gate 85 transmits clock pulses CLKR simultaneously but since the pulses CLKR do not include a $\overline{CT}$ control, the gate 85 will transmit a clock pulse CLKR after the signal $\overline{CT}$ is initiated to reset the flip-flops $FF_7$ and $FF_8$. That terminates the signal $\overline{CT}$ and finally shuts the clock generator 33 off.

A second gate 90 (FIG. 6) is connected to the gate 82 to enable the clock generator 33 in response to an instruction POT following the EOM-05 instruction. As noted hereinbefore, an EOM-05 instruction sets a flip-flop $FF_5$ which remains set until a POT instruction is executed. With both flip-flops $FF_1$ and $FF_5$ set by an EOM-05 instruction, a gate 91 transmits a ready signal ($\overline{RT}$) that indicates to the computer that the communications link is ready to load data. When a POT instruction is executed, the computer transmits to the communications link a signal POT2 (shown in FIG. 2). Its complement enables the flip-flop $FF_5$ to be reset when the computer clock phase Qq2 falls. In the meantime, while POT2 is true, and before $FF_5$ is reset, a gate 92 transmits a signal "data load" (DL) shown in FIG. 2 to the data enable terminal of the shift register 80 to enter the data word placed on terminals $C_0$ to $C_{23}$ by the POT instruction on the fall of the current clock Qq2 applied to the clock input terminal of the shift register via gate 87.

As previously indicated, both input and output instructions (PIN and POT instructions) are always preceded by an EOM. Thus, when a data word has been received, and a flip-flop $FF_{10}$ has been set to interrupt the computer via the control message decoder 48, the computer first executes an EOM-20 instruction to set the flip-flop $FF_1$ (FIG. 6) and a flip-flop 11 (FIG. 7). The function decoder 61 detects the octal code 20 as noted hereinbefore and sets the flip-flop $FF_1$ just as it sets flip-flop $FF_5$ for an EOM-05 instruction to enable the gate 91 (via a gate 93 that performs an OR function) to transmit the ready signal $\overline{RT}$ shown in FIG. 2 for an input operation. Upon receipt of that signal, the computer proceeds to await phase of only one computer cycle as with a POT instruction. Data transfer is accomplished in the computer by first resetting the C-register and then copying information output terminals $\overline{C}_{d0}$ to $\overline{C}_{d23}$ of the shift register 80 through gates 94 (FIG. 7).

Once an EOM-05 instruction has been executed to set the flip-flop $FF_1$, the four clock pulses (CLK) transmitted by the gate 84 are inverted by a gate 100 and transmitted by a gate 101 which performs an OR function. The former is enabled by the signal TC from the gate 70 which enables the clock generator for just four clock cycles to shift the four-bit code message out as a signal EOD to the gate 74 (FIG. 7).

Once the counter 34 has reached a count of three, the flip-flop $FF_7$ is set by the fourth clock transmitted by the gate 85. If the EOM instruction does not involve a data word transfer (i.e., does not involve an EOM-05 instruction), the flip-flop $FF_5$ will not be set and the gate 63 will initiate a $\overline{CT}$ signal to reset the counter 34 and reset the flip-flop $FF_7$ in response to an extra clock pulse as described hereinbefore. If it is an EOM-05 instruction, the gate 63 is inhibited from initiating a $\overline{CT}$ signal to reset the counter. Consequently, a count of four is left standing in the counter after the four-bit "data follows" message code has been transmitted. Thereafter, when a POT instruction is executed, a "data load" signal (DL) is inactivated by the gate 92 as described hereinbefore. The flip-flop $FF_5$ is then reset to disable the gate 63. At the same time, a flip-flop $FF_2$ is set under control of a gate 102.

When the flip-flop $FF_2$ is set, a gate 90 initiates a transmit data signal TD, after $\overline{POT2}$ becomes true, and turns the clock generator 33 on via the gate 82. The clock generator then transmits clock pulses (CLK) to the counter 34 and the data shift register 80 via a gate 103 and a gate 104. The shift enable terminal of the shift register 80 is activated by the complementary transmit data signal $\overline{TD}$ via a gate 105 which functions as an OR gate. The gate 104 also functions as an OR gate. When the counter 34 has advanced from a count of 4 to a count of 28, all the bits of the data word will have been transmitted to the output driver through gate 75. The next clock pulse from the generator 33 sets flip-flop $FF_8$ in response to a gate 106 decoding a count of 28 to cause the gate 65 to initiate a signal $\overline{CT}$ to reset the counter 34.

While the 29th clock pulse is setting the flip-flop $FF_8$ to register the 29th clock pulse, and the gate 106 is decoding the count of 28, the latter initiates a signal CT28 to enable the gate 76. The 29th clock pulse applied to the output driver 32 as the flip-flop $FF_8$ is being set then transmits a parity bit from the generator 81 which as before stated may be simple a flip-flop caused to change state with each binary 1 transmitted through gate 75. The signal CT28 then samples the state of the flip-flop to generate the parity bit for an even parity check. When the count of 29 is reached, as indicated by the flip-flop $FF_8$, being set, the signal $\overline{CT}$ initiated by the gate 65 causes an extra pulse to be generated and transmitted as a clock pulse CLKR to reset the flip-flops $FF_7$ and $FF_8$. Meantime, the flip-flop $FF_1$ is reset by the signal $\overline{CT}$ to complete an operation of transmitting a data word in response to a POT instruction following an EOM-05 instruction. It should be noted that the flip-flop $FF_1$ is similarly reset by the signal $\overline{CT}$ initiated by the gate 63 detecting a count of four upon executing an EOM-OX instruction other than the EOM-05 instruction once the four-bit code message has been transmitted.

The manner in which a communications link receives a four-bit code message will now be described with reference principally to FIG. 7. The code message is received through the signal conditioner 45 connected to the channel 22 and converted from a three-level signal to a two-level signal INDA and a clock signal as described with reference to FIG. 5. The clock signal is transmitted by the gate 86 as an internal clock ICLK for operation of the communications link in the receiving mode.

The first pulse of the clock ICLK sets flip-flop $FF_3$ to block the EOM decoder 30 so that the computer associated with the communications link will not interfere with the incoming code message or data word. At the same time, a 20-microsecond timer 110 is set to perform a rate check on the incoming bits of the code message or data word. That check is to determine that a full bit count of 4 or 29 has occurred in a period of 20 microseconds, a period more than sufficient for transmission of a data word at a clock rate of 2 MHz., which is at a rate of one bit every half microsecond. Failure to receive a full count in that period is obviously a transmission failure of some sort and a flip-flop $FF_6$ is set via gate 111 to initiate a signal HOP through a gate 112 which provides an OR function. In the meantime, the input data INDA is applied to a parity check circuit 113. At a count of 3, and again at a count of 28 in the counter 34, the parity check circuit is enabled via a gate 114. The next bit received, which is the last bit of a message code and of a data word, is then checked for parity. If a parity error is found, bits 1 and 0 are transmitted over lines 115 and 116 to the error message generator 50 implemented as a four-bit shift register having two fixed inputs such that the error code entered is 1001; otherwise the shift register is set with a code 1010, which is the code to be transmitted to indicate a rate error if the 20-microsecond period expires before a full count is reached.

The parity check may be implemented with two flip-flops. The first flip-flop is initially reset (i.e., set in the 0 state) and then caused to change state in response binary 1's only. After three or 28 bits have been received, that flip-flop will be in the 0 state when the parity bit is received if the number of binary 1's is even. For an even parity check, the parity bit is then compared directly with the state of that flip-flop. It they are not alike a parity error exists, and a second flip-flop is set. The true (Q) output of the second flip-flop is connected to the line 115, and the complementary ($\overline{Q}$) output is connected to the line 116.

Once the full count is reached, the signal CT initiated by gate 65 (FIG. 6) enables the shift register 50 to enter the bits 1001 if a parity error is present, while the complementary signal $\overline{CT}$ enables the contents of the register to be shifted out through the gate 77 to the output driver 32. The clock pulses CLKR required at a gate 117 are produced by the clock generator 33 which is turned on by the signal $\overline{HOP}$ applied to gate 80. However, gate 117 will not transmit clock pulses until the flip-flop $FF_6$ is set after the 20 microsecond period of the timer 110. Therefore, if a parity error is detected, the code 1001 is not entered until the flip-flop $FF_6$ is set. Then four additional clock pulses will shift the error code out and initiate the signal $\overline{CT}$ to reset the flip-flop $FF_6$ and the parity clock circuit 113.

While the CLKR clock pulses are being transmitted by gate 85 (FIG. 6), CLK clock pulses are also being transmitted by the gate 84 to the output driver 32 for transmission of the error code over the channel 22. In that regard, it should be noted that the signal $\overline{CT}$ which resets the flip-flop $FF_6$ also resets the flip-flop $FF_3$ to terminate the receiving mode of operation. Thus, once a count of 4 is reached by the counter 34 and the flip-flop $FF_7$ is set, the gate 65 initiates a signal CT to reset the counter and terminate the transmitting mode of operation. The complementary signal $\overline{CT}$ is transmitted by a gate 118 to reset the flip-flop $FF_6$ and the parity check circuit 113.

If a full count is not reached during the receiving mode of operation when the 20-microsecond period expires, the signal HOP enables the gate 66 (FIG. 6) to initiate a full count signal CT in order that the bits 1010 may be entered into the shift register 50. The rate error code is thus transmitted in the same manner as a parity error code, or any other message code.

From the foregoing discussion of the error check section 47 and error message generator 50 of FIG. 3 (with reference to the logic network shown in FIG. 7 between the signal conditioner 45 and the output driver 32), it may be readily appreciated that an error in transmission will result in the immediate transmission of an error message by the receiving communications link. If the error occurs in a four-bit message code, a computer interrupt signal initiated by setting a flip-flop is immediately terminated by resetting the interrupt flip-flop. This will be described for the code message that "data follows." Other code messages transmitted in response to other EOM instructions having octal operation codes 03, 04, 06 and 07 will set a flip-flop in the receiving communications link in the same manner as an EOM instruction having the octal code 05, the only difference being that for the octal code 05 the computer does not receive an interrupt signal until a second flip-flop is set indicating that the data word has been received.

When the four-bit "data follows" code is received as the signal INDA, the message clock pulses ICLK from the gate 86 (FIG. 7) are transmitted by the gate 101 to the shift register 62. Once all but the parity bit have been shifted in, they are decoded by the message decoder 48 under control of the flip-flop $FF_3$ indicating a receiving mode of operation is in progress and the signal CT3 indicating a count of three has been reached by the counter 34. That control is through a gate 120 which enables the control message decoder.

Once a control message has been decoded, an appropriate one of a bank of interrupt flip-flops is set, such as the flip-flop $FF_4$ for the "data follows" message. Other flip-flops may interrupt the computer more directly, but the flip-flop $FF_4$ does not, as just noted; instead it disables the gate 63 so that the counter 34 will not be reset at the count of four, but will instead proceed to a count of 29 when a data word is received. However, if an error occurs in the "data follows" message code, or any other message code, the signal HOP will reset the counter through gate 66. At the same time, the complementary signal $\overline{HOP}$ will reset the flip-flop $FF_4$ through a gate 121 which functions as an OR gate. Other interrupt flip-flops (not shown) are reset directly in a similar manner when an error has been detected. In the case of a parity error, the interrupt flip-flop will be set a maximum of only one period of a 2 mHz. clock, which is a period of 0.5 μsec., a period which is not sufficiently long for the computer to act on it.

In the case of a message that "data follows," the flip-flop $FF_4$ does not interrupt the computer directly, and if the parity bit is not received, for example, the signal $\overline{HOP}$ generated at the end of the 20-microsecond period simply resets it. In the case of the data word that follows, flip-flop $FF_{10}$ is set only when the signal CT is generated, indicating that a count of 29 has been reached. That is done by a gate 122. If the flip-flop $FF_8$ is never set due to a rate error, the flip-flop $FF_{10}$ is never set either, but if the flip-flop $Ff_8$ is set, a $\overline{CT}$ signal is initiated through gate 65 to reset the flip-flop $FF_3$ and $FF_8$. As the flip-flop $FF_8$ is reset, a flip-flop $FF_{10}$ is then set as the signal at the output of gate 122 falls. If the 20-microsecond period lapses before the flip-flop $FF_8$ can be set, the flip-flop $FF_6$ is set, thereby generating a signal $\overline{HOP}$ which will reset the flip-flop $FF_4$.

It should be noted that a 24-bit word received through the signal conditioner 45 (following a code message that "date follows") is shifted into the data register 80 as input data INDA in response to clock pulses ICLK at gate 104. The shift register 80 is enabled to respond to those clock pulses by a gate 123 in response to the following Boolean expression:

$$SE = FF_4 \cdot FF_7 \cdot \overline{CT28}$$

The flip-flop $FF_4$ is set only when a data follows message has been decoded. Once the flip-flop $FF_4$ is set, the flip-flop $FF_7$ is set, and remains set until the flip-flop $FF_8$ is set at the count of 29. Since the 29th bit is a parity bit and is not to be shifted into the register 80, the signal $\overline{CT28}$ is applied as an additional control to prevent the register 80 from shifting in response to the 29th clock pulse (ICLK). That is transmitted through the gate 85 to set the flip-flop $FF_8$. The additional (30th pulse required to reset the flip-flops $FF_7$ and $FF_8$ is produced by the clock generator 33 enabled by the signal $\overline{CT}$ at the gate 82, as described hereinbefore. Since that pulse is only transmitted through the gate 85 as a reset clock pulse CLKR, and not applied anywhere as an input clock ICLK, the register 80 will not be shifted by the extra (30th clock pulse either. Once the flip-flop $FF_7$ has thus been reset, the gate 123 is again disabled.

Once the flip-flop $FF_{10}$ is set by the gate 122, a flip-flop $FF_{12}$ is set by the fall of the next computer clock pulse Qq1. The false output ($\overline{Q}$) of the flip-flop $FF_{12}$ then resets the flip-flop $FF_{10}$. The flip-flop $FF_{12}$ itself remains set to provide an interrupt signal to the computer until reset by a signal RSI from the computer when the computer program in progress is interrupted and the subroutine for executing EOM-20 and PIN instructions is entered into. The instruction EOM-20 is decoded by the function decoder to generate a signal EOM-20 applied to the J-input terminal of flip-flop $FF_{11}$ (FIG. 7). The fall of the next Qq2 pulse then sets the flip-flop $FF_{11}$ to enable the gates 94 and transmit a ready signal $\overline{RT}$ to the computer via gates 93 and 91 (FIG. 6). The computer responds to the $\overline{RT}$ signal and executes a PIN instruction to immediately (after a minimum of one wait cycle for the SDS-900 series of computers) accept the data from the gates 94. At the same time, the computer generates a signal $\overline{RTi}$ which resets the flip-flop $FF_{11}$. The flip-flop $FF_4$ is reset earlier by a signal $\overline{PIN}$ from the computer immediately upon the PIN instruction being decoded.

In the case of other interrupt flip-flops, each would indicate a different action, and therefore call for a different instruction. For example, a "ring-up" message code received indicates that a reply should be sent. The reply is an EOM-04 instruction. Once the computer is interrupted, the interrupt condition is reset by the computer in a similar manner.

From the foregoing, it should be appreciated that an improved communications link has been provided to enable a plurality of computers to communicate with each other, and that the invention is in no sense dependent upon the particular type of computer employed. Thus, although a particular embodiment has been described with reference to a particular type of computer, the teachings of the invention are equally applicable to other embodiments particularly adapted for use with a different type of computer. Accordingly, it is not intended that the scope of the invention be determined by the disclosed exemplary embodiment, but rather should be determined by the breadth of the appended claims.

What is claimed is:

1. A communications link for a given digital computer, said link being adapted to transmit and receive over a single channel control code message and data words in series by bit to and from another computer through a like communications link associated therewith, comprising:

means for receiving control code messages and data words, one at a time, from said given digital computer;

means for transmitting over said channel said control code messages and data words in series by bit at a clock rate independent of cycle time of said given computer and said other computer;

means for receiving control code messages and data words, one at a time, from said like communications link associated with said other computer over said channel; and means responsive to each control code message received for transmitting an appropriate one of a plurality of unique interrupt signals to said given computer except in response to a data transfer code message that data follows, and for transmitting a unique interrupt signal to said given computer in response to a data word that follows a data transfer code message.

2. A communications link as defined in claim 1 including a clock pulse generating means for use in transmitting data words and code messages, and a counter for control of said clock pulse generating means in transmitting a predetermined number of bits for a data word, and a predetermined number of bits for a code message.

3. A communications link as defined in claim 2 wherein each data word and control code message includes a parity bit, further comprising:

means for checking for parity error in each code message and data word received; and error control means connected to said parity error checking means for inhibiting transmission of an interrupt signal to said given computer and for initiating transmission to said other computer through said transmitting means an error code message after a lapse of predetermined time following receipt of the first bit thereof, said time being sufficient for said like communications link associated with said other computer to complete a transmission cycle.

4. A communications link as defined in claim 3 wherein said error control means includes means for initiating transmission of an error code message after lapse of said predetermined time unless the proper number of bits have been received for a control code message or for a data word, whichever is being received, and means for counting bits received to determine when the proper number of bits have been received.

5. A communications link as defined in claim 4 wherein said transmitting means transmits binary digits in serial form as a three-level signal consisting of pulses of a given polarity for binary-1 digits, pulses of opposite polarity for binary-0 digits, and a return to zero between successive pulses.

6. A communications link as defined in claim 5 wherein said receiving means includes:

means for reshaping pulses of said given polarity and omitting pulses of said opposite polarity to provide a conventional two-level signal to represent binary digits in serial form; and means for generating input clock pulses in time coincidence with pulses of both polarities, and using said input clock pulses for synchronizing the operations of receiving a code message and data word to which said pulses pertain.

7. A communications link connected to receive and transmit in parallel by bits data words from and to a given computer, and to transmit and receive serially by bit data words to and from a like communications link connected to another computer, and to receive in parallel by bits instruction words from said given computer, and to transmit and receive in series by bits control code messages, a given code message being transmitted by a given link in response to a unique instruction received by the transmitting link, comprising:

means responsive to each one of said instruction words for transmitting a unique control code message to said other communications link at a clock rate independent of said given computer, a particular instruction being to transmit a particular control code message indicating that a data word is to be received thereafter in parallel from said given computer, and is to be transmitted in serial form at a clock rate independent of said given computer;

means for receiving control code messages and data words, one at a time, from said like communications link in serial form; and interrupt control means responsive to each control code message received for transmitting an appropriate one of a plurality of unique interrupt signals to said given computer except in response to a control code message that data follows, and for transmitting a unique interrupt signal to said given computer in response to a data word that follows said particular control code message.

8. A communications link as defined in claim 7 wherein transmission of control code messages and data words to and from said like communications link is over a single channel in the form of a three-level signal comprising pulses of a given polarity for binary-1 digits, pulses of opposite polarity for binary-0 digits, and a return to zero-volt level between successive pulses.

9. A communications link as defined in claim 8 including a received signal conditioning means for converting a three-level signal received into a conventional two-level signal for binary data and clock pulses on separate lines, and wherein control code messages and data words are received from said like communications link over said single channel through said signal conditions means.

10. A communications link as defined in claim 9 further comprising:

error control means connected to said interrupt control means for inhibiting transmission of an interrupt signal to said given computer and for initiating transmission to said other computer through said transmitting means an error code message after a lapse of predetermined time without a full message or word being received following receipt of the first bit thereof, said time being sufficient for said like communications link associated with said other computer to complete a transmission cycle.

11. A communications link as defined in claim 10 wherein each data word and control code message includes a parity bit, further comprising:

means for checking for parity error in each code message and data word received; and said error control means is responsive to said parity error checking means for inhibiting transmission of an interrupt signal from said interrupt control means to said given computer and for initiating transmission to said other computer through said transmitting means an error code message after a lapse of said predetermined time following receipt of the first bit thereof.

12. A communications link for a given digital computer, said link being adapted to transmit and receive over a single channel control code messages and data words in series by bit to and from another computer through a like communications link associated therewith, said digital computer having a plurality of like communications links connected thereto, comprising:

means for receiving an instruction from said digital computer, said instruction having an address code uniquely identifying said communications link from other like communications link;

means responsive to said instruction for transmitting over said channel a particular control code message specified by said instruction in series by bit at a clock rate independent of cycle time of said given computer and said other computer;

means for transmitting over said channel a data word after a control code message has been transmitted indicating that data follows to enable the transmitting operation to take place;

means for receiving control code messages and data words, one at a time, from said like communications link associated with said other computer over said channel; and means responsive to each control code message received for transmitting an appropriate one of a plurality of unique interrupt signals to said given computer except in response to a data transfer code message that data follows, and for transmitting a unique interrupt signal to said given computer in response to a data word that follows a data transfer code message.

13. A communications link as defined in claim 12 including a clock pulse generating means for use in transmitting data words and code messages, and a counter for control of said clock pulse generating means in transmitting a predetermined number of bits for a data word, and a predetermined number of bits for a code message.

14. A communications link as defined in claim 13 wherein each data word and control code message includes a parity bit, further comprising:

means for checking for parity error in each code message and data word received; and error control means connected to said parity error checking means for inhibiting transmission of an interrupt signal to said given computer and for initiating transmission to said other computer through said transmitting means an error code message after a lapse of predetermined time following receipt of the first bit thereof, said time being sufficient for said like communications link associated with said other computer to complete a transmission cycle.

15. A communications link as defined in claim 14 wherein said error control means includes means for initiating transmission of an error code message after lapse of said predetermined time unless the proper number of bits have been received for a control code message or for a data word, whichever is being received, and means for counting bits received to determine when the proper number of bits have been received.

16. A communications link as defined in claim 15 wherein said transmitting means transmits binary digits in serial form as a three-level signal consisting of pulses of a given polarity for binary-1 digits, pulses of opposite polarity for binary-0 digits, and a return to zero between successive pulses.

17. A communications link as defined in claim 16 wherein said receiving means includes:

means for reshaping pulses of said given polarity and omitting pulses of said opposite polarity to provide a conventional two-level signal to represent binary digits in serial form; and means for generating input clock pulses in time coincidence with pulses of both polarities, and using said input clock pulses for synchronizing the operations of receiving a code message and data word to which said pulses pertain.

* * * * *